(12) United States Patent
Bhagath (10) Patent No.: US 7,604,441 B2
(45) Date of Patent: Oct. 20, 2009

(54) CUTTING INSERT FOR A MILLING CUTTER (75) Inventor: Kedar Suresh Bhagath, Bangalore (IN)

(73) Assignee: TaeguTec India P Ltd., Bangalore (IN)

( * ) Notice: Subject to any disclaimer, the term of this patent is extended or adjusted under 35 U.S.C. 154(b) by 29 days.

(21) Appl. No.: 12/045,783

(22) Filed: Mar. 11, 2008

(65) Prior Publication Data

US 2008/0232912 A1    Sep. 25, 2008

(30) Foreign Application Priority Data

Mar. 21, 2007    (IL)    ..................... 182100

(51) Int. Cl.
*B23B 27/16*    (2006.01)
*B23C 5/20*    (2006.01)
(52) U.S. Cl. .......................... 407/113; 407/42; 407/116
(58) Field of Classification Search .................... 407/33, 407/34, 42, 47, 48, 102–104, 113, 116; B23C 5/20; B23B 27/16
See application file for complete search history.

(56) References Cited

U.S. PATENT DOCUMENTS

| | | | | |
|---|---|---|---|---|
| 3,800,379 | A | * | 4/1974 | Hopkins ..................... 407/113 |
| 4,915,548 | A | | 4/1990 | Fouquer et al. |
| 5,007,775 | A | * | 4/1991 | Pantzar ........................ 407/113 |
| 5,382,118 | A | | 1/1995 | Satran et al. |
| 5,454,670 | A | * | 10/1995 | Noda et al. .................... 407/42 |
| 5,597,271 | A | | 1/1997 | Men et al. |
| 5,803,674 | A | | 9/1998 | Satran et al. |
| 5,807,031 | A | * | 9/1998 | Arai et al. .................... 407/113 |
| 5,971,672 | A | | 10/1999 | Hansson |
| 6,336,776 | B1 | | 1/2002 | Noggle |
| 6,530,726 | B2 | | 3/2003 | Nelson |
| 6,543,970 | B1 | * | 4/2003 | Qvarth et al. ............... 407/114 |
| 7,073,987 | B2 | * | 7/2006 | Hecht .......................... 407/113 |
| 7,419,338 | B2 | * | 9/2008 | Smilovici et al. ........... 407/113 |

FOREIGN PATENT DOCUMENTS

EP          548752 A1 *  6/1993
WO          96/35538     11/1996

OTHER PUBLICATIONS

International Search Report in PCT/IN2008/000170, dated Sep. 24, 2008.

* cited by examiner

*Primary Examiner*—Boyer D Ashley
*Assistant Examiner*—Sara Addisu
(74) *Attorney, Agent, or Firm*—Womble Carlyle (57) ABSTRACT

A fully indexable square cutting insert has four side surfaces connecting to two end surfaces. At the intersection of each side surface with an end surface is a primary cutting edge which extends from an insert corner and along a first side surface, in a downward direction towards a median plane. A wiper extends from the same insert corner and along an adjacent side surface, in an upward direction away from the median plane, to rise above an abutment surface of an associated end surface. The geometry of the cutting insert and of the insert pocket in which the insert is seated are such that the primary cutting edge has a positive axial angle (helix), while the insert has an overall negative axial angle for providing axial clearance and an overall negative radial angle for providing radial clearance.

20 Claims, 13 Drawing Sheets

CUTTING INSERT FOR A MILLING CUTTER

FIELD OF THE INVENTION

The current invention relates to a cutting insert of the sort used in milling cutters. More particularly, it concerns a cutting insert having a square footprint and capable of forming a 90° cut in a work piece.

BACKGROUND OF THE INVENTION

There are numerous metal cutting applications requiring that a 90° shoulder be cut in a work piece. To make a 90° shoulder, a cutting insert seated in a tool preferably employs an operative primary cutting edge in conjunction with a wiper (sometimes referred to as a 'secondary' cutting edge) to which it is connected via a corner. Such a cutting insert needs the following clearances with respect to the tool: a primary cutting edge relief angle, a wiper relief angle, and relief between any non-operative cutting edges at the work piece.

U.S. Pat. No. 6,336,776 discloses a fully indexable negative geometry polygonal insert for machining a square (or 90°) corner, in a work piece. The disclosed insert uses an operative primary cutting edge extending in a first direction from each corner of the polygon downwardly from an associated major polygonal surface of the insert along with a wiper lying substantially in the plane of the associated major surface and extending in a second direction from the insert corner. Instead of being directly connected to the insert corner, the wiper is spaced apart from the insert corner by a transitional cutting edge.

The geometry of the primary cutting edge enables mounting of the insert to a milling cutter with negative axial rake, such that the primary cutting edge is substantially parallel to an axis of rotation of the cutting tool. The wiper laying on the major surface does not have a positive rake face associated with it. Thus, when the insert is seated to provide the primary cutting edge with negative axial rake and negative radial rake, an acute angle is formed between the wiper and the work piece, resulting in a double negative cutting geometry, which may adversely impact surface finish.

Also, when the insert is positioned on the tool the primary cutting edge is parallel to the axis of rotation, i.e., the axial angle is zero. This exerts a high load on cutting because the entire cutting edge experiences the material all at once, and there is no gradual entry of the cutting edge in the material.

SUMMARY OF THE INVENTION

In one aspect, the present invention is directed to a double-ended indexable cutting insert comprising: first and second substantially square end surfaces facing opposite directions, each end surface having an associated abutment surface and four associated insert corners; four side surfaces connecting the first and second end surfaces to form a total of eight edges, each edge comprising a primary cutting edge, a wiper and a transitive edge connecting the primary cutting edge to the wiper, at least the primary cutting edge and the wiper occupying a common plane; a median plane M located mid-way between the first and second end surfaces and passing through the four side surfaces, wherein: each insert corner has associated therewith: a primary cutting edge extending from said each insert corner in a downward direction towards the median plane M; and a wiper extending from said each insert corner in an upward direction away from the median plane M, said wiper rising above an associated abutment surface with respect to the median plane.

A leading portion of the primary cutting edge which is closest to the insert corner may rise above the associated abutment surface with respect to the median plane.

In a side view of the cutting insert, the primary cutting edge may slope from a first insert corner towards the median plane M and form an angle $\alpha$ therewith, while the wiper may slope from a second insert corner away from the median plane M and form an angle $\beta$ therewith, $\alpha \neq \beta$. Typically the angle $\alpha \geq \beta$. In one embodiment, the angle $\alpha$ is between 6° and 12°, and the angle $\beta$ is between 0° and 6°.

Each end surface may comprise a peripheral groove fully encircling the abutment surface, the peripheral groove having an outer portion which slopes downwardly from a nearest edge, and an inner portion which rises towards the abutment surface.

The abutment surface may comprise a plurality of projecting abutment pads. At least a leading portion of the primary cutting edges and the wipers may rise above the projecting abutment pads. The projecting abutment pads are at a height $H1$ above the median plane M, a high point of the wipers is at a height $H2$ above the projecting abutment pads; and a ratio of $H2/H1$ may be between 0.25-0.5.

In a side view of the cutting insert, the primary cutting edge may extend from its associated insert corner and along its associated side surface sufficiently far to provide a depth of cut of $L1$, which is between 0.5-0.7 times the length $L$ of its associated side surface; and the wiper may extend from its associated insert corner and along its associated side surface for a distance of $L2$, which is between 0.1-0.2 times the length $L$ of its associated side surface.

The cutting insert may further comprise a throughbore passing between the first and second end surfaces and through the median plane.

A sidewall of the throughbore is provided with a plurality of sets of contact surfaces, the contact surfaces of a first set intersecting a first plane and the contact surfaces of a second set intersecting a second plane which is spaced apart from the first plane, the first and second planes both being parallel to the median plane, and located on opposite sides of the median plane.

The contact surfaces of the first set and the second set are configured relative to one another such that a clamping screw inserted at a non-zero angle relative to a through bore axis abuts at least one contact surface from each set.

In another aspect, the present invention is directed to a milling cutter having an axis of rotation R and comprising: a cutter body having a front face connecting to a peripheral surface and at least one insert pocket opening out to both the front face and the peripheral surface, with a double-ended indexable cutting insert of the sort described above seated in the at least one insert pocket.

When seated in the milling cutter, the cutting insert may have an overall negative axial relief angle for providing axial clearance and an overall negative radial relief angle for providing radial clearance.

When seated in the milling cutter, an operative primary cutting edge of the cutting insert may have a positive axial rake angle while an operative wiper may have a negative radial rake angle.

In the milling cutter, the insert pocket may have a pocket base which slopes downwardly in the axial direction towards the front face, and slopes downwardly in the radial direction towards the peripheral surface.

The insert pocket may comprise spaced apart first and second radial abutment surfaces and an axial abutment surface which together provide three-point contact with adjacent non-operative sides of the cutting insert.

The insert pocket may have a pocket base provided with a clamping bore which is inclined at a predetermined non-zero angle relative to a normal to the pocket base; and a clamping screw passing through a through bore of the cutting insert and occupying the clamping bore applies a clamping force at least partially in a direction of a far corner of the insert pocket.

In the milling cutter, the cutting insert is preferably seated in the at least one insert pocket such that an operative primary cutting edge and an operative wiper are arranged to cut a true 90° shoulder in a work piece, while still providing clearance for a non-operative primary cutting edge lying on the same plane as the operative wiper.

BRIEF DESCRIPTION OF THE DRAWINGS

For a better understanding of the present invention and to show how the same may be carried out in practice, reference will now be made to the accompanying drawings, in which.

DETAILED DESCRIPTION OF PREFERRED EMBODIMENTS

The contents of aforementioned U.S. Pat. No. 6,336,776 are incorporated by reference to the extent necessary to understand the present invention.

FIGS. 1-5 show one embodiment of a cutting insert 100 in accordance with the present invention. Cutting insert 100 is preferably formed from carbide or other material by pressing and sintering, injection molding, or other known manner.

Figure 1:
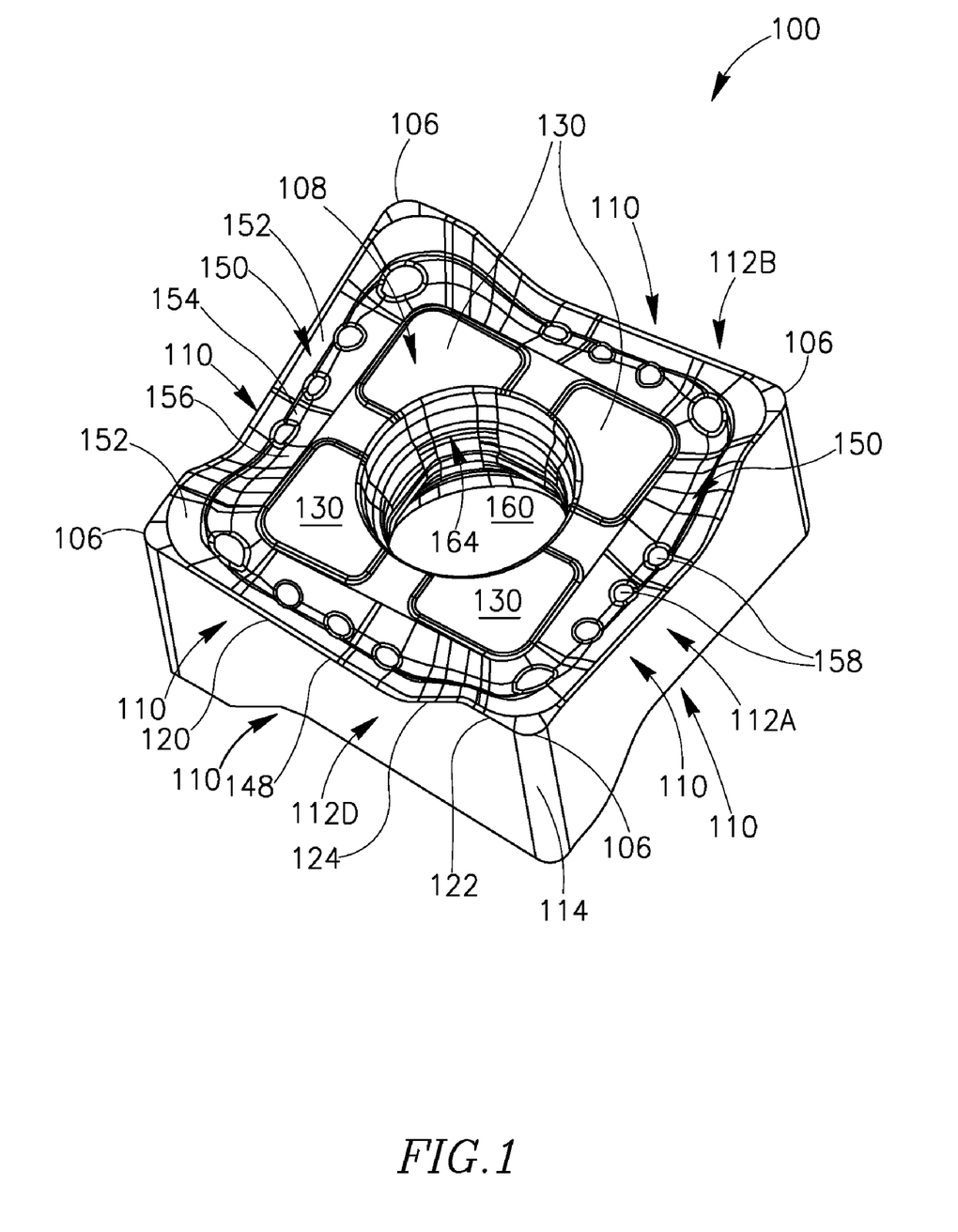
FIG. 1 shows a perspective view of a cutting insert in accordance with one embodiment the present invention.
Figure 2:
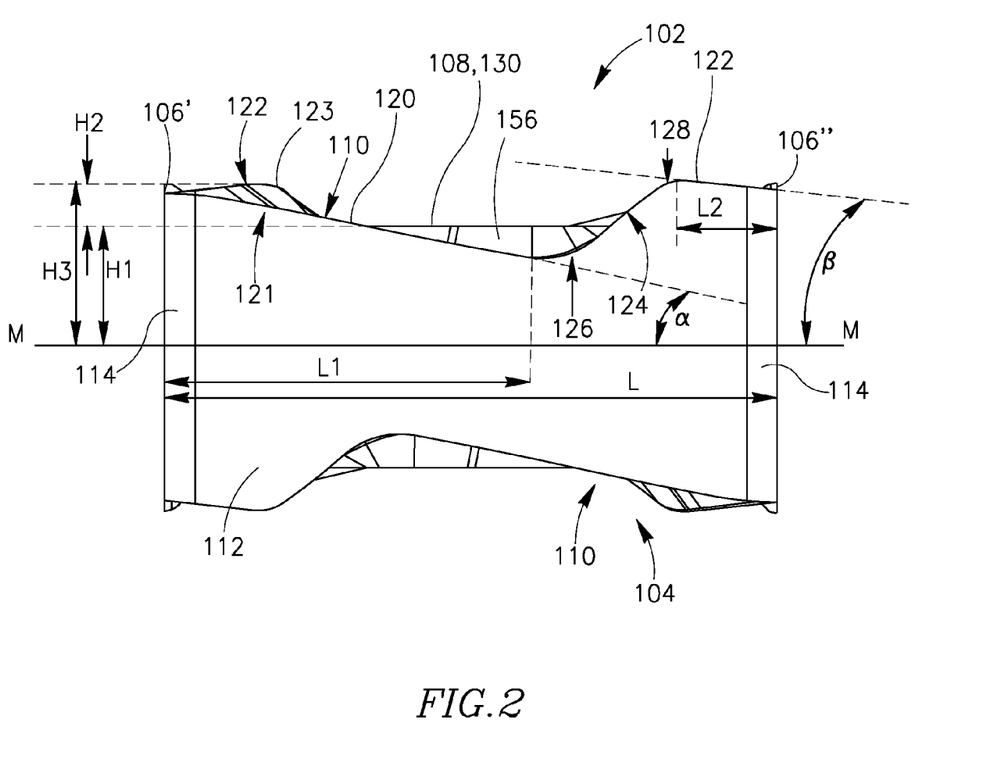
FIG. 2 shows a side view of the cutting insert of FIG. 1.
Figure 3:
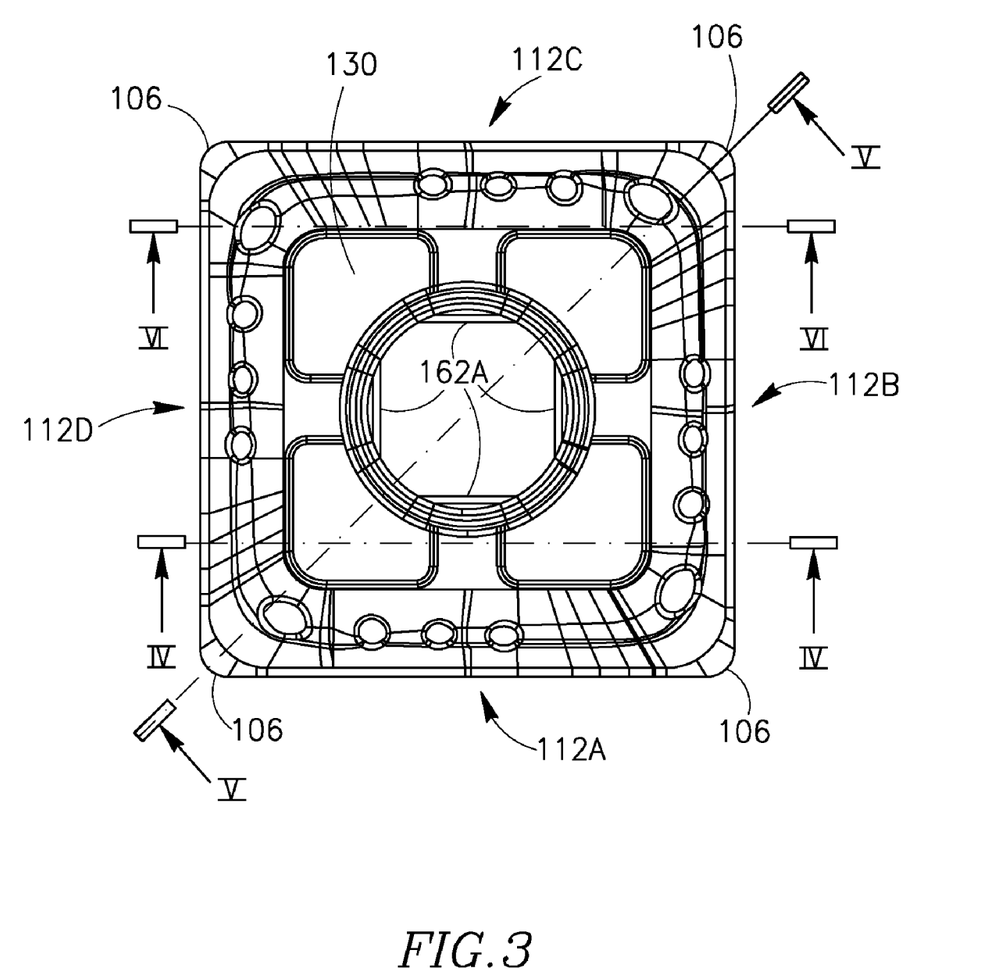
FIG. 3 shows an end view of the cutting insert of FIG. 1.
Figure 4:
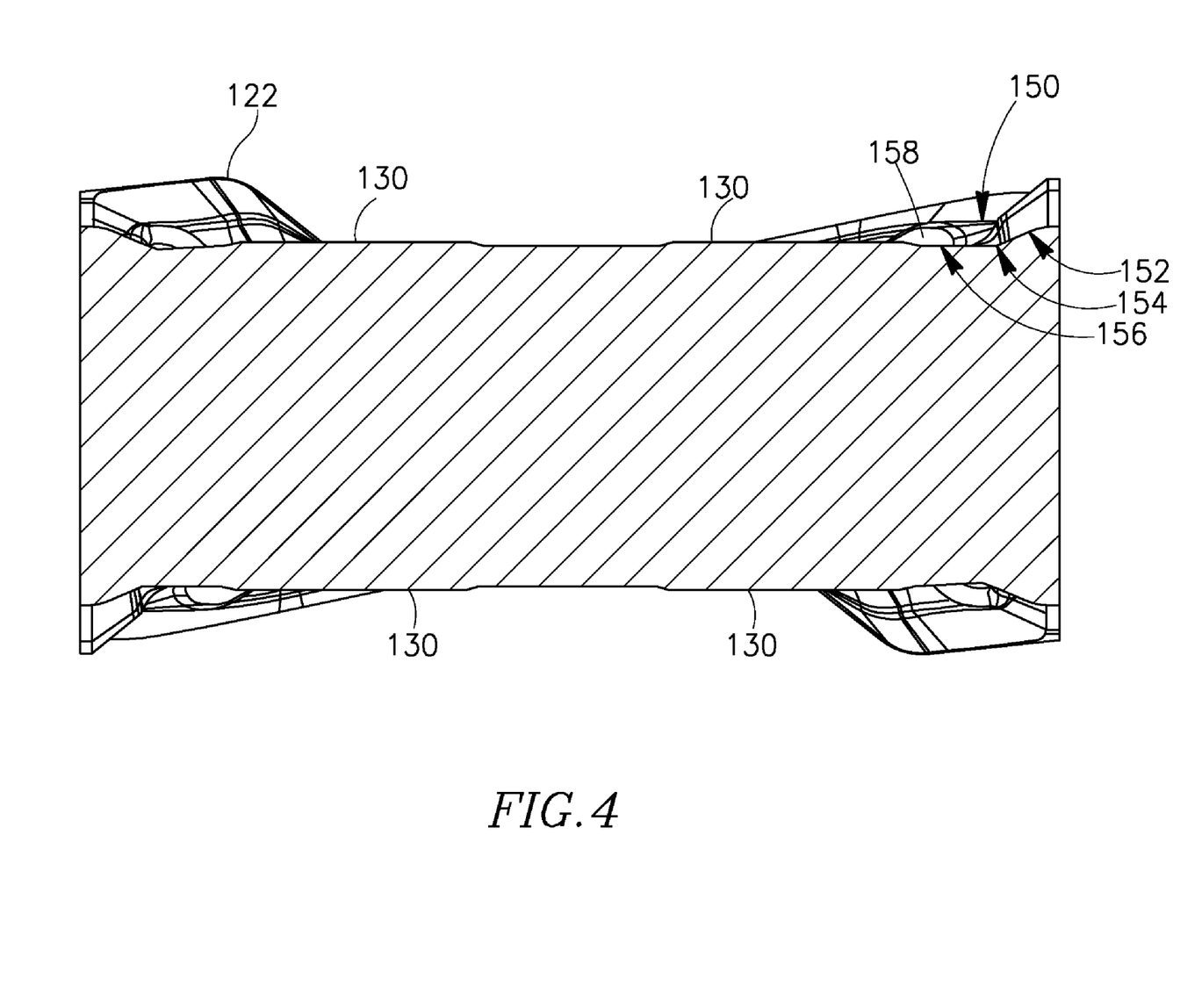
FIG. 4 shows a section view of the cutting insert taken along line IV-IV in FIG. 3.

Cutting insert 100 is double-ended (i.e., reversible) with each end being four-way indexable, providing a total of eight cutting positions. The insert's first end surface 102 and second end surface 104 face in opposite directions and are substantially square in an end view (see FIG. 3). Each end surface is provided with an associated abutment surface 108 in a central region thereof, and four associated insert corners 106. As seen in FIGS. 2 and 4, the insert corners 106 do not form the high points, in a side view of the cutting insert.

The cutting insert 100 has four side surfaces 112A, 112B, 112C, 112D, adjacent pairs of which are connected at corner surfaces 114. The four side surfaces 112A, 112B, 112C, 112D connect the first end surface 102 to the second end surface 104. An edge 110 is formed at the intersection of each side surface with each end surface, giving the insert a total of eight such edges 110. Each edge 110 is provided with a narrow land 148 for strength. Each edge 110 comprises a primary cutting edge 120, a wiper 122 and a transitive edge 124 connecting the primary cutting edge 120 to the wiper 122. The transitive edge 124 may include a first curved portion 126 proximate the primary cutting edge 120 and a second curved portion 128 proximate the wiper 122. As best seen in FIG. 3, the primary cutting edge 120 and the wiper 122 occupy a common plane, in an end view of the cutting insert.

As seen in FIG. 2, the cutting insert has a median plane M which is located mid-way between the first and second end surfaces 102, 104 and passes substantially perpendicularly through the four side surfaces.

Each insert corner 106 is located between an associated primary cutting edge 120 and an associated wiper 122.

The associated primary cutting edge 120 extends from the insert corner 106 in a downward direction towards the median plane M, along its associated side surface 112. A leading portion 121 of the primary cutting edge 120 which is closest to the insert corner 106', is above the abutment surface 108 of the associated end surface 102 (see FIG. 2). In one embodiment, the primary cutting edge 120 extends from its associated insert corner 106' along its associated side surface 112 sufficiently far to provide a depth of cut of L1, which is between 0.5-0.7 times the length L of its associated side surface 112. Meanwhile, the wiper edge 122 extends from its associated insert corner 106" along its associated side surface for a distance of L2, which is between 0.1-0.2 times the length L of its associated side surface 112.

The associated wiper 122 extends from the insert corner 106 in an upward direction away from the median plane M, and rises above an associated abutment surface 108. Unlike the wiper seen in U.S. Pat. No. 6,336,776, wiper 122 begins at the insert corner 106 instead of being spaced apart therefrom. The wiper 122 may be straight (as shown), or may instead comprise an arc which extends upwardly from the insert corner 106. The wiper 122 may further be provided with slight downward tapering (a "dishing angle") at its far end to ensure that the end does not touch a work piece.

In a side view of the cutting insert (see FIG. 2), the primary cutting edge 120 slopes downwardly from one insert corner 106 towards the median plane M and forms an angle $\alpha$ therewith. Meanwhile, the wiper 122 slopes upwardly from an adjacent insert corner 106" away from the median plane M and forms an angle $\beta$ therewith. In general, $\alpha \neq \beta$. In some embodiments $\alpha \geq \beta$. Generally speaking, the angle $\alpha$ may be between 6° and 12° while the angle $\beta$ may be between 0° and 6°.

In one embodiment, the abutment surface 108 comprises a plurality of projecting abutment pads 130 (see FIGS. 1 and 4), which are coplanar with one another, and parallel to the median plane M. It is understood, however, that in other embodiments, the abutment pads need not be either planar or coplanar with one another, and need not be parallel to the median plane M. The leading portion 121 of the primary cutting edge 120 and the wipers 122 are above the abutment pads 130, facilitating chip flow. As seen in the embodiment depicted in FIG. 2, the abutment surface 108 and the projecting abutment pads 130 are at a height H1 above the median plane M. Meanwhile, the high point 123 of the wiper 122 is at a height H2 above the abutment surface 108, or a height H3=H1+H2 above the median plane M. The actual values of H1, H2 and H3 will vary depending on the specific insert design. However, in typical embodiments, the ratio of H2/H1 is between 0.25-0.5.

Returning to FIG. 1, each end surface has a peripheral groove 150 fully encircling the abutment surface 108. The peripheral groove 150 has an outer portion 152 which slopes downwardly from a nearest edge 110 to a base portion 154, and an inner portion 156 which rises from the base portion 154 towards the abutment surface 108 and abutment pads 130. Chip forming structures 158 are provided on the base portion 154 to help curl chips and control their flow so as to prevent damage to the abutment pads 130 during a cutting operation (see FIGS. 4-6).

Figure 5:
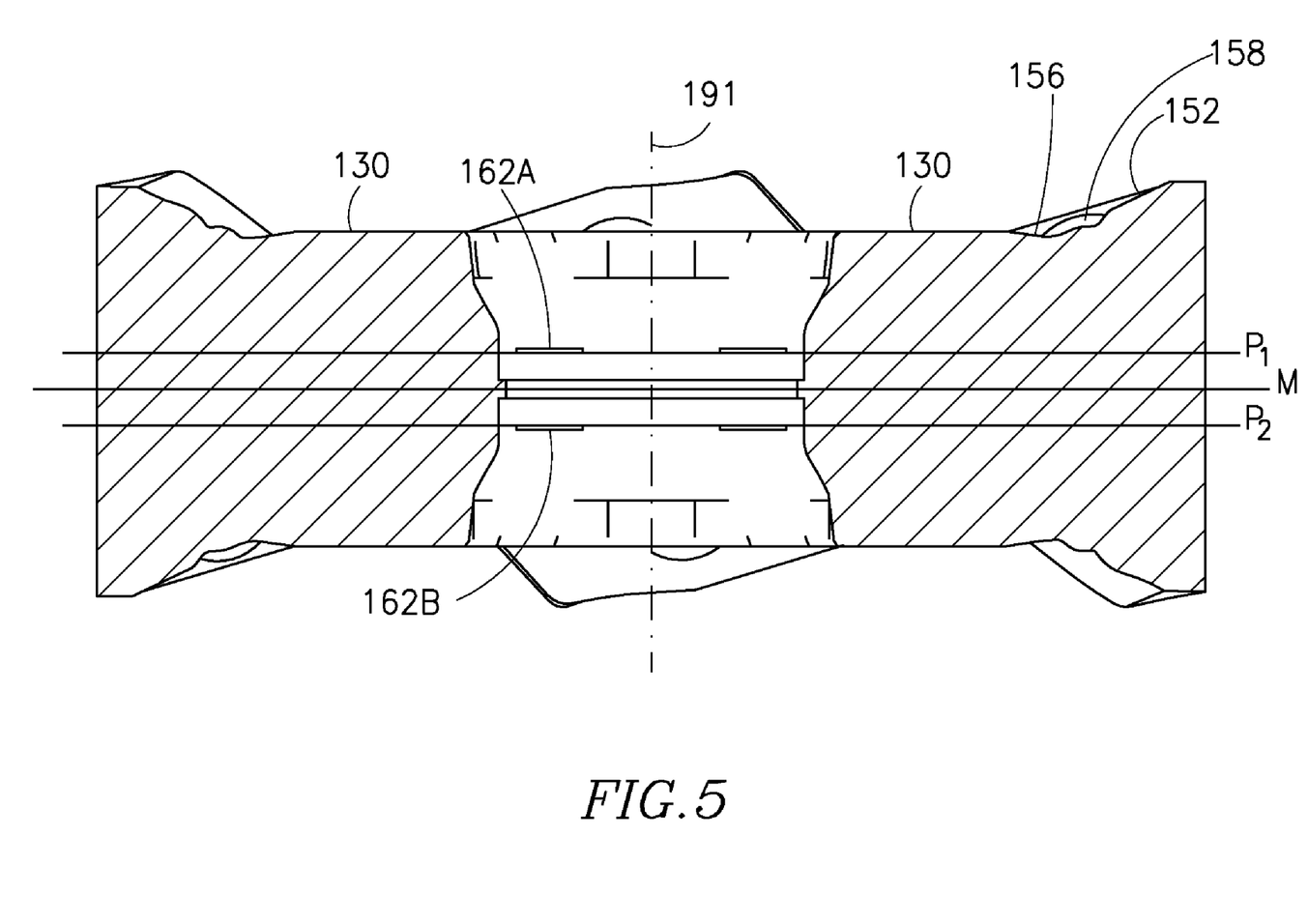
FIG. 5 shows a section view of the cutting insert taken along line V-V in FIG. 3.
Figure 6:
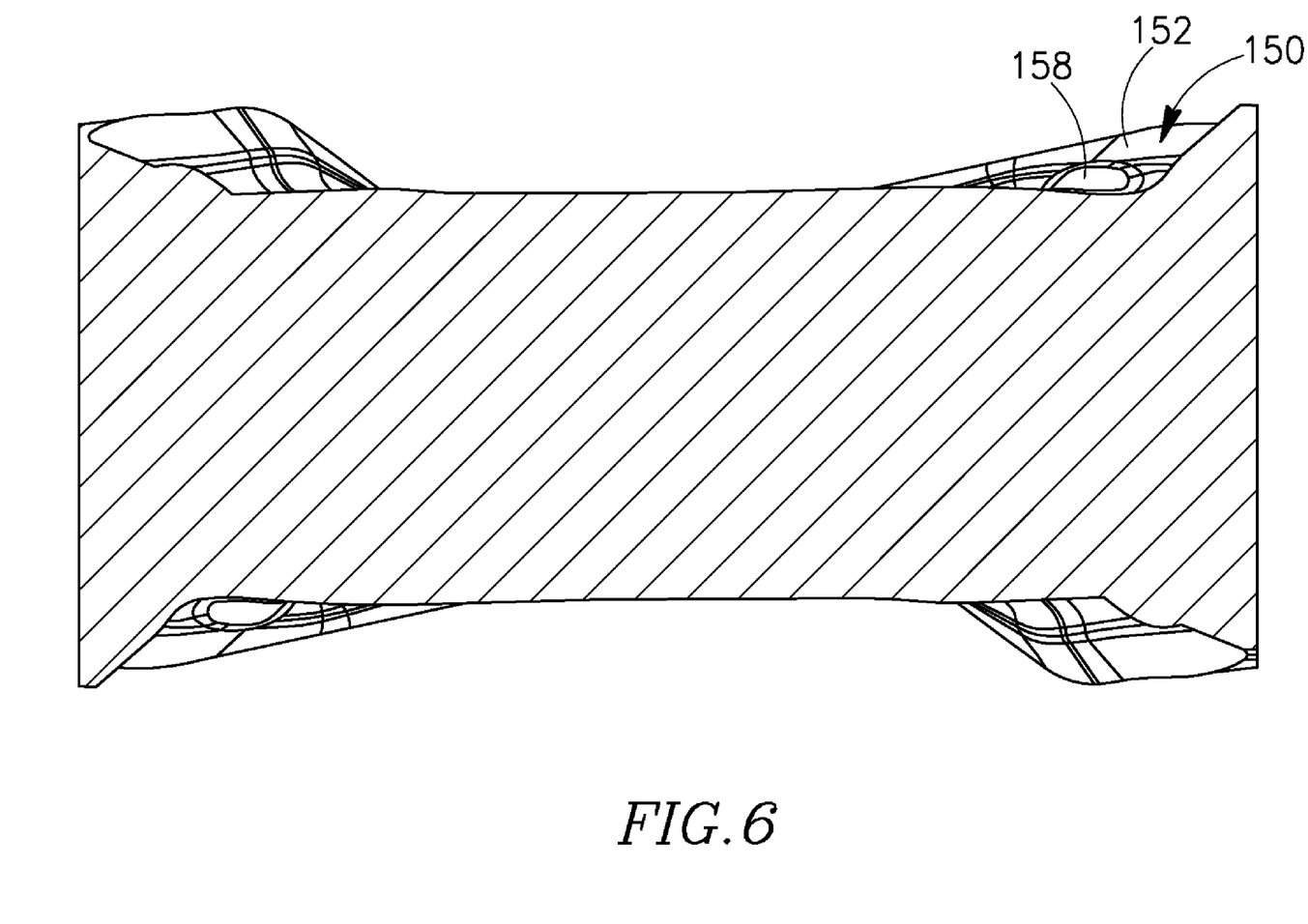
FIG. 6 shows a section view of the cutting insert taken along line VI-VI in FIG. 3.

A throughbore 160 passes between the first and second end surfaces 102, 104 and through the median plane M. The throughbore 160 is configured to receive a clamping screw to secure the cutting insert 100 in an insert pocket of a tool. The sidewall 164 of the throughbore 160 is provided with formations 162A, 162B which allow a clamping screw to be accommodated therein, in a plurality of orientations. In one embodiment, the formations comprise eight arcuate contact surfaces 162A, 162B divided into two sets, each set comprising four surfaces, the surfaces of a given set being intersected by a common imaginary plane. As seen in FIG. 5, the two imaginary planes P1, P2 are parallel to each other and also to the median plane M, and are located on opposite sides of the median plane M. The first set of four surfaces 162A are intersected by the first imaginary plane P1 and the second set of four surfaces 162B are intersected by the second imaginary plane P2.

Figure 7:
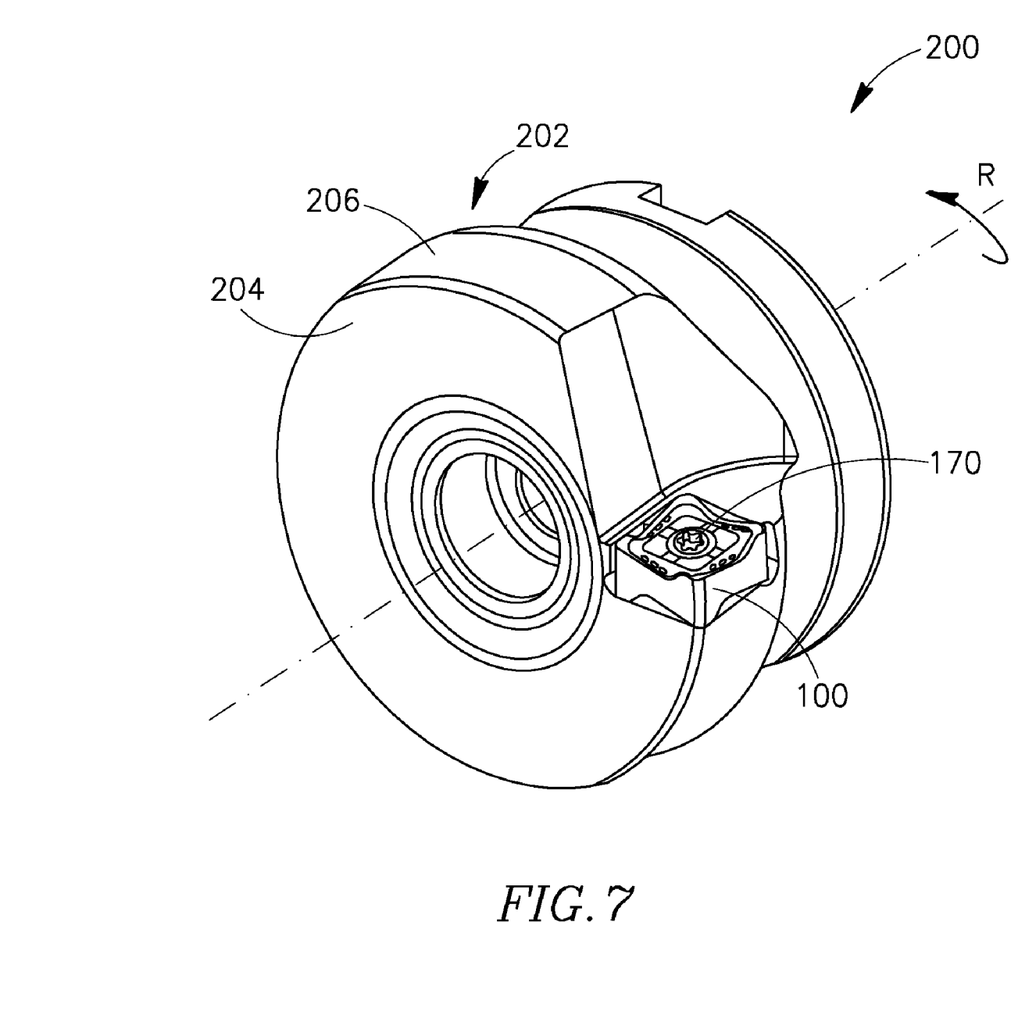
FIG. 7 shows a perspective view of a cutting tool having the cutting insert of FIG. 1 seated therein.

FIG. 7 shows a milling cutter 200 in accordance with one embodiment of the present invention. The milling cutter 200 includes a cutter body 202 having an axis of rotation R and a front face 204 connecting to a cylindrical peripheral surface 206. Formed in the cutter body 202 is at least one insert pocket 208 that opens out to both the front face 204 and the peripheral surface 206. A double-ended indexable cutting insert 100 of the sort described above is seated in the insert pocket 208 and retained therein by a clamping screw 170.

Figure 9:
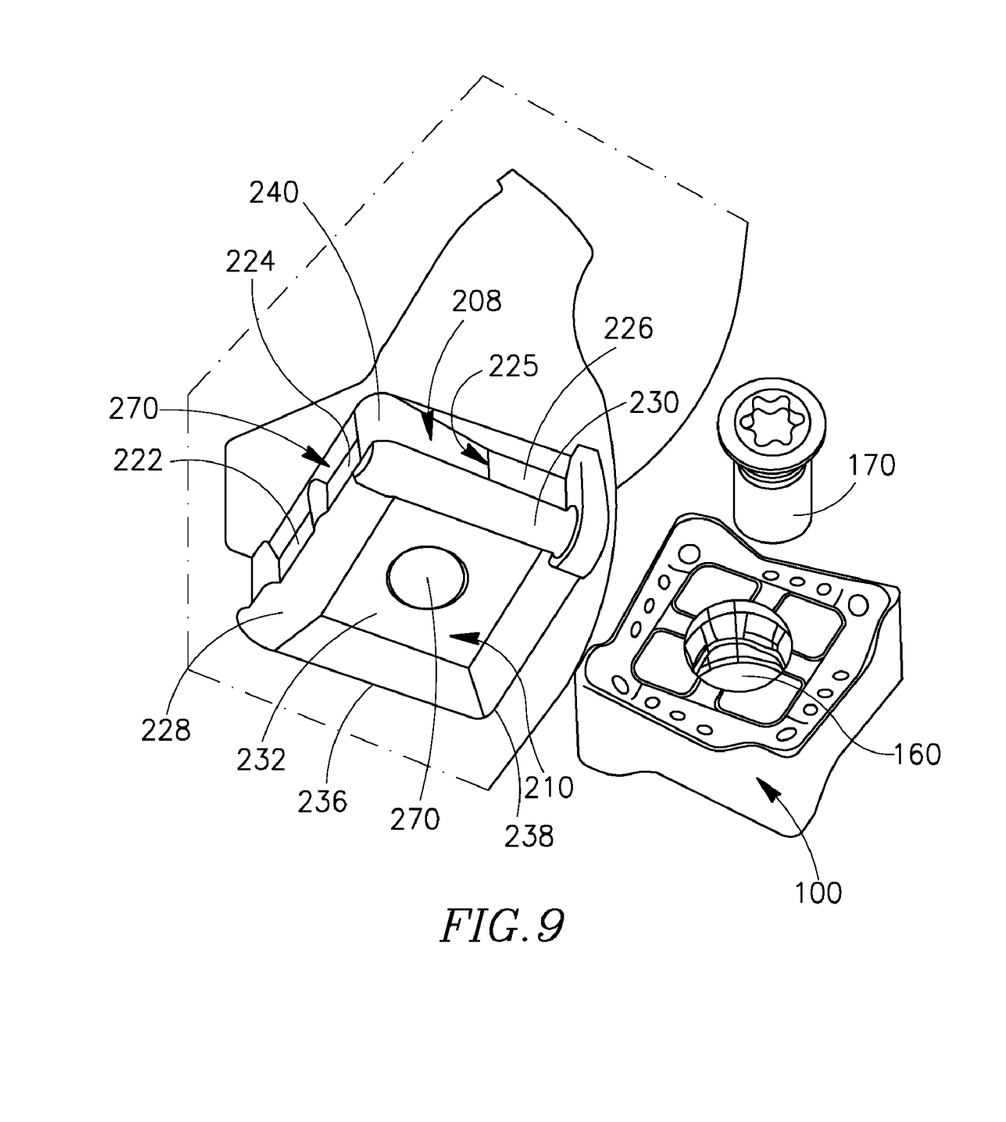
FIG. 9 shows an exploded view of the cutting tool of FIG. 7.

As seen in FIG. 9, the insert pocket 208 includes a pocket base 210 generally facing in the direction of rotation R, a generally radially facing side wall 220 comprising spaced apart first 222 and second 224 radial abutment surfaces, and a generally axially facing side wall 225 comprising an axial abutment surface 226. Together, the abutment surfaces 222, 224 and 226 provide three-point contact with adjacent non-operative sides of the cutting insert 100.

Figure 8:
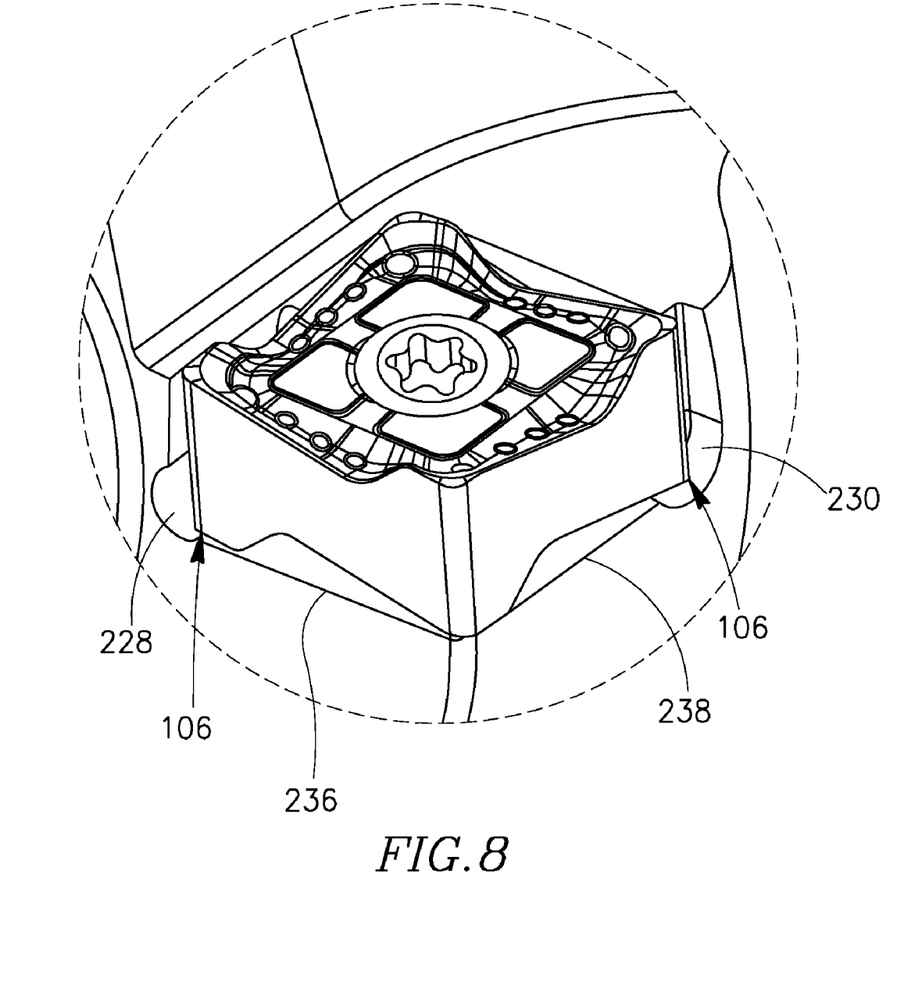
FIG. 8 shows an enlarged perspective view of the seated insert in the cutting tool of FIG. 7.

An axially directed relief channel 228 connects the radially facing side wall 220 to the pocket base 210, while a radially directed relief channel 230 connects the axially facing side wall 225 to the pocket base 210, the relief channels 228, 230 merging near a far corner 240 of the insert pocket 208. The pocket base 210 comprises a clamping bore 270 and a raised surface 232 which is elevated relative to the insert pocket's lower axial edge 236 and lower radial edge 238. When the cutting insert 100 is seated in the insert pocket 208, the insert's abutment pads 130 rest upon the raised surface 232, while the relief channels 228, 230 accommodate corners 106 of the non-operative end surface (see FIG. 8).

Figure 10:
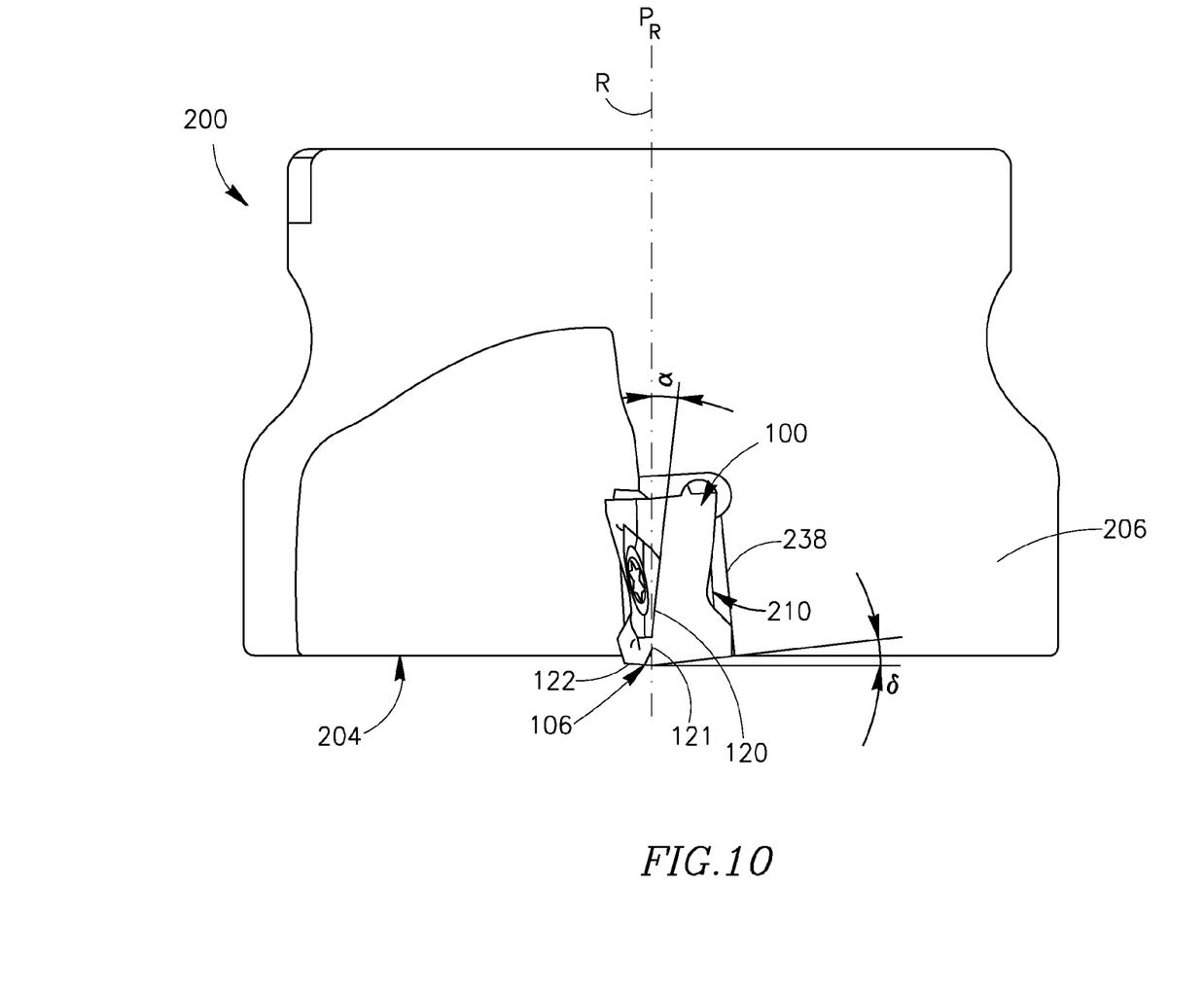
FIG. 10 shows a side view of the cutting tool of FIG. 7.

FIG. 10 shows a side view of the tool 200 oriented such that a reference plane $P_R$ (perpendicular to the page) contains the axis of rotation R and passes through the operative insert corner 106 of the cutting insert 100. In this orientation, it can be seen that the operative primary cutting edge 120 has a positive axial rake angle γ (or positive helix), allowing for gradual entry of primary cutting edge 120 into a work piece, commencing with its leading portion 121. It can further be seen in this figure that the double ended cutting insert 100 has a negative axial relief angle δ which provides axial clearance for the operative wiper 122. As also seen in this figure; the pocket base 210 slopes downwardly in the axial direction towards the front face 204.

Figure 11:
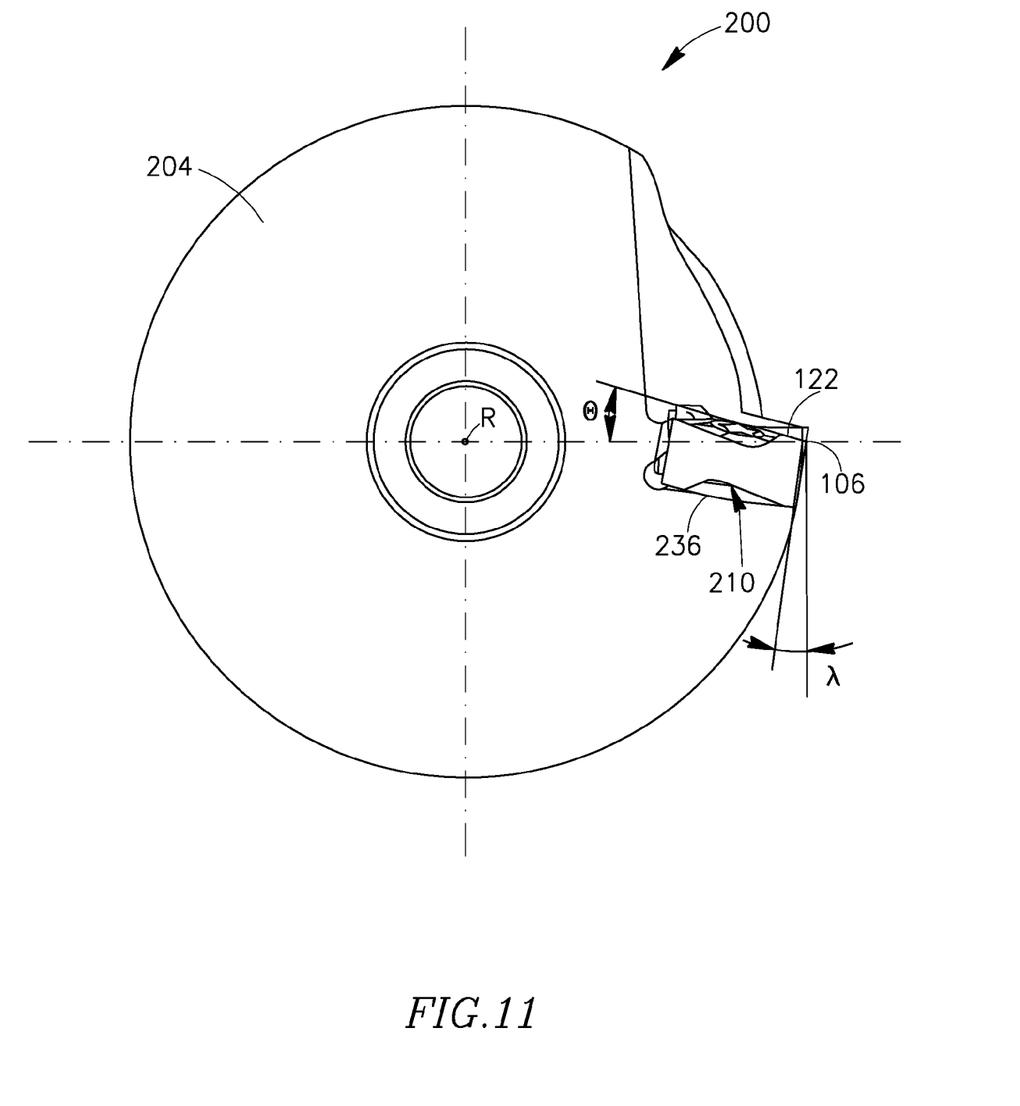
FIG. 11 shows a face view of the cutting tool of FIG. 7.

FIG. 11 shows an end view of the tool 200 in the same orientation with reference plane $P_R$ again passing though the operative insert corner. It can be seen from this figure that the operative wiper 122 has a negative radial rake angle θ while the cutting insert 100 maintains a negative radial relief angle λ which provides radial clearance for the operative primary cutting edge 120. As also seen in this figure; the pocket base 210 slopes downwardly in the radial direction towards the peripheral face 206.

The arrangement seen in FIGS. 10 and 11 potentially provides the cutting tool 200 with a number of characteristics. First, the insert 100 is seated on the tool 200 in such a way that the primary cutting edge 120, from the insert corner 106 to the transitive edge 124, lies on a constant radius of rotation as the axis of rotation R. This coupled with the insert's negative axial angle δ and negative radial rake angle λ, helps ensure a true 90° cut in a work piece up to the length of the primary cutting edge 120. Furthermore, the operative wiper 122, with its negative radial rake angle, becomes parallel to the surface of the work piece during a cutting operation, promoting an even and smooth surface. In this orientation, there is a clearance between the non-operative cutting edge lying on the plane of the operative wiper 122 and the work piece, thus ensuring that the operative wiper 122 is the only portion of the insert responsible for finishing the face of the work piece.

Figure 12:
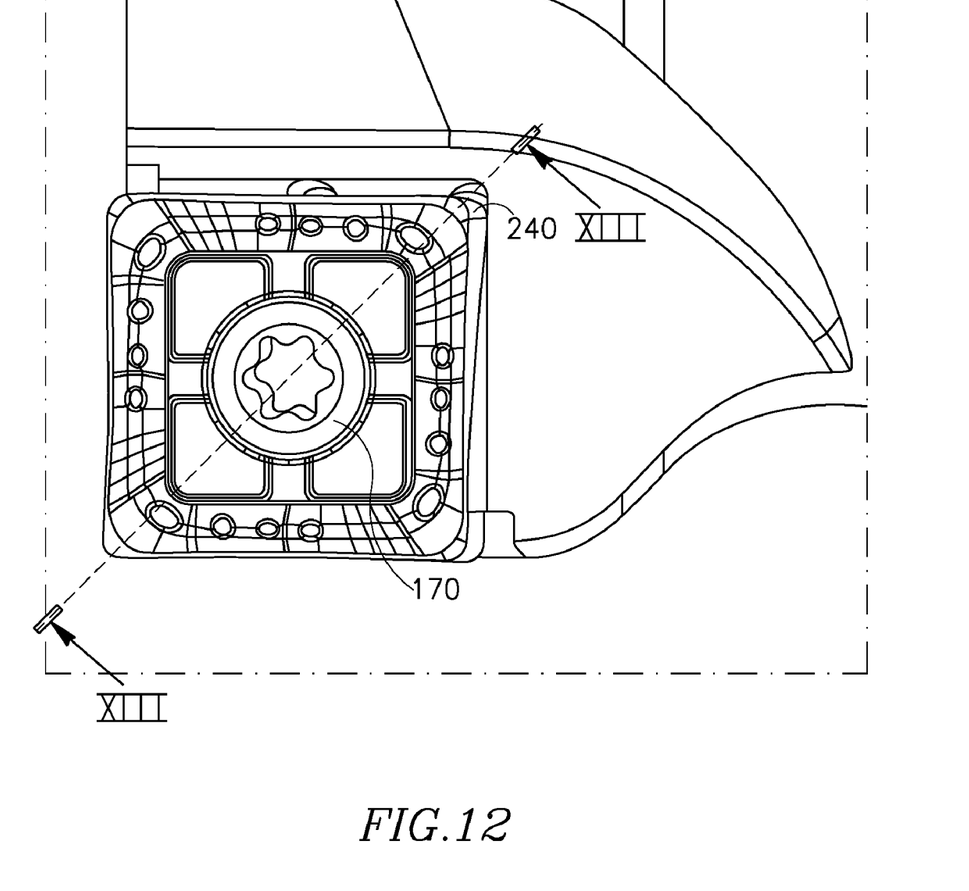
FIG. 12 shows an end view of the cutting insert seated in the cutting tool of FIG. 7.
Figure 13:
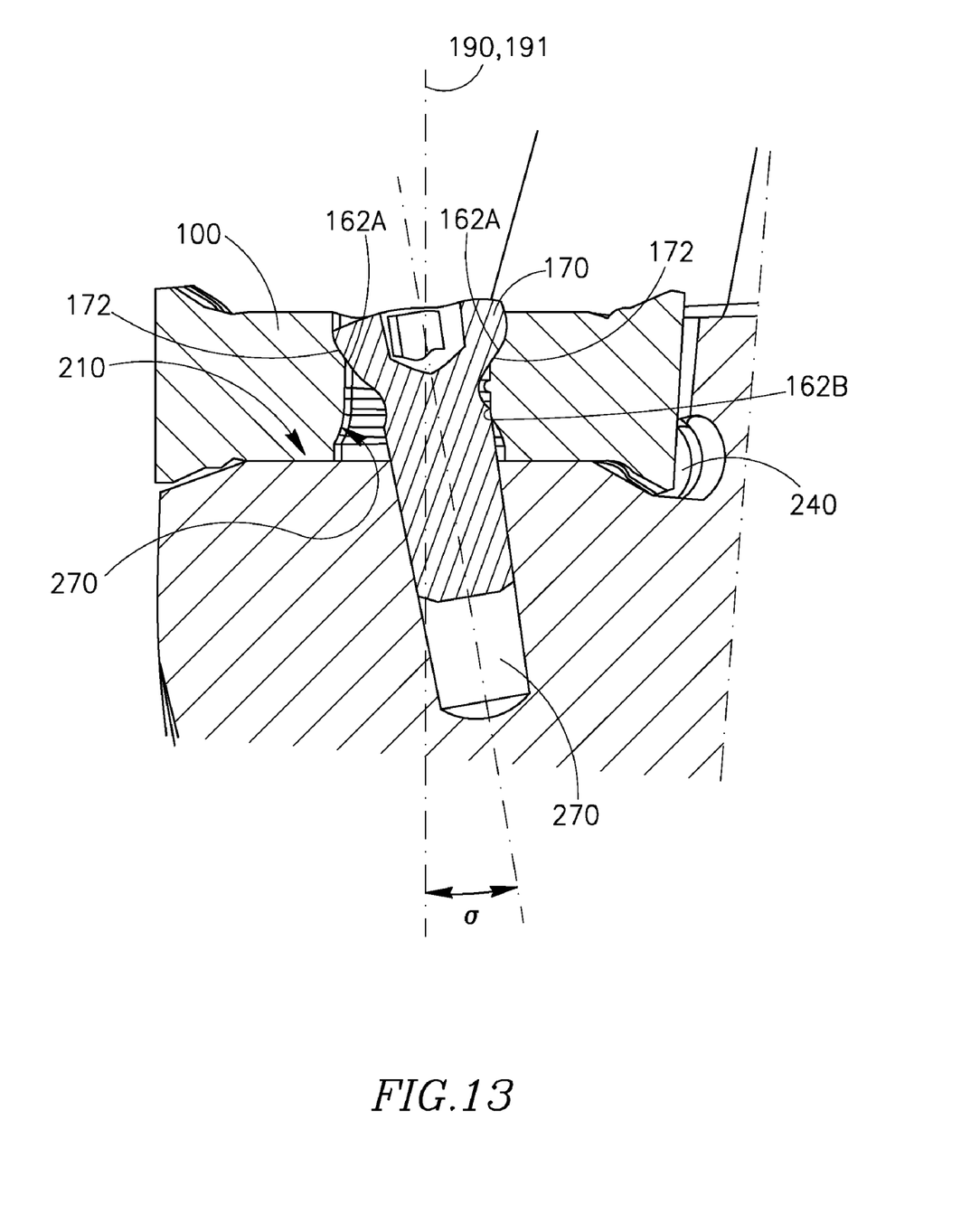
FIG. 13 shows a section view taken along line XIII-XIII in FIG. 12.

As seen in FIGS. 12 and 13, the clamping bore 270 may be inclined at a predetermined non-zero angle σ relative to a normal 190 (perpendicular) to the pocket base 210, the normal 190 being coincident with a central axis 191 of the through bore 160. Inclining the clamping screw 170 such that the resultant direction of the clamping action is towards the far corner 240 of the pocket 208 may provide better retention and less chatter of the cutting insert 100 during cutting operations. When the clamping screw 170 is inclined in such a manner, its clamping surfaces 172 abut contact surfaces belonging to both sets (162A and 162B) present on the side wall 164 of the cutting insert's through bore 160. It is understood therefore, that by virtue of these contact surfaces, a given cutting insert may selectively be secured to a pocket base having an inclined through bore, or to a pocket base having a perpendicular through bore. Each set of contact surfaces 162A, 162B intersects separate planes P1, P2 that are spaced-apart from one another on either side of the median plane M. Abutting the contact surfaces associated with only one plane, P1 or P2, may cause swiveling of the clamping screw 170, but abutting the contact surfaces associated with two planes P1 and P2 reduces this likelihood. Furthermore, abutting the contact surfaces on a single plane may result in over-constrained seating of the clamping screw 170 since only the highest points will abut. On the other hand, abutting contact surfaces belonging to separate planes does not suffer from this. Thus, the contact surfaces of the first set 162A and the second set 162B are configured relative to one another such that a clamping screw 170 inserted at a non-zero angle relative to a through bore axis 191 abuts at least one contact surface from each set.

Although the present invention has been described to a certain degree of particularity, it should be understood that various alterations and modifications could be made without departing from the scope of the invention as hereinafter claimed.

What is claimed is:

1. A double-ended indexable cutting insert comprising:
   first and second substantially square end surfaces facing opposite directions, each end surface having an associated abutment surface and four associated insert corners;
   four side surfaces connecting the first and second end surfaces to form a total of eight edges, each edge comprising a primary cutting edge, a wiper and a transitive edge connecting the primary cutting edge to the wiper, at least the primary cutting edge and the wiper occupying a common plane in an end view of the cutting insert;

a median plane located mid-way between the first and second end surfaces and passing through the four side surfaces;
wherein:
each insert corner has associated therewith:
an associated primary cutting edge extending from said each insert corner in a downward direction towards the median plane; and
an associated wiper extending from said each insert corner in an upward direction away from the median plane, said wiper rising above an associated abutment surface with respect to the median plane.

2. The cutting insert according to claim 1, wherein a leading portion of the primary cutting edge which is closest to the insert corner, is above said associated abutment surface with respect to the median plane.

3. The cutting insert according to claim 1, wherein, in a side view of the cutting insert:
the primary cutting edge slopes from a first insert corner towards the median plane and forms an angle α therewith;
the wiper slopes from a second insert corner away from the median plane and forms an angle β therewith, α≠β.

4. The cutting insert according to claim 3, wherein α≧β.

5. The cutting insert according to claim 4, wherein α is between 6° and 12°, and β is between 0° and 6°.

6. The cutting insert according to claim 1, wherein each end surface comprises a peripheral groove fully encircling the abutment surface, the peripheral groove having an outer portion which slopes downwardly from a nearest edge, and an inner portion which rises towards the abutment surface.

7. The cutting insert according to claim 1, wherein the abutment surface comprises a plurality of projecting abutment pads.

8. The cutting insert according to claim 7, wherein at least a leading portion of the primary cutting edges and the wipers are above the projecting abutment pads with respect to the median plane.

9. The cutting insert according to claim 8, wherein:
the projecting abutment pads are at a height H1 above the median plane;
a high point of the wipers is at a height H2 above the projecting abutment pads; and
a ratio of H2/H1 is between 0.25-0.5.

10. The cutting insert according to claim 1, wherein, in a side view of the cutting insert:
the primary cutting edge extends from its associated insert corner and along its associated side surface sufficiently far to provide a depth of cut of L1, which is between 0.5-0.7 times the length L of its associated side surface; and
the wiper extends from its associated insert corner and along its associated side surface for a distance of L2, which is between 0.1-0.2 times the length L of its associated side surface.

11. The cutting insert according to claim 1, further comprising a throughbore passing between the first and second end surfaces and through the median plane.

12. The cutting insert according to claim 11, wherein a sidewall of the throughbore is provided with a plurality of sets of contact surfaces, the contact surfaces of a first set intersecting a first plane and the contact surfaces of a second set intersecting a second plane which is spaced apart from the first plane, the first and second planes both being parallel to the median plane, and located on opposite sides of the median plane.

13. The cutting insert according to claim 12, wherein:
the contact surfaces of the first set and the second set are configured relative to one another such that a clamping screw inserted at a non-zero angle relative to a through bore axis abuts at least one contact surface from each set.

14. A milling cutter having an axis of rotation R and comprising:
a cutter body having a front face connecting to a peripheral surface and at least one insert pocket opening out to both the front face and the peripheral surface; and
a double-ended indexable cutting insert seated in the at least one insert pocket, the cutting insert comprising:
first and second substantially square end surfaces facing opposite directions, each end surface having an associated abutment surface and four associated insert corners;
four side surfaces connecting the first and second end surfaces to form a total of eight edges, each edge comprising a primary cutting edge, a wiper and a transitive edge connecting the primary cutting edge to the wiper, at least the primary cutting edge and the wiper occupying a common plane in an end view of the cutting insert;
a median plane located mid-way between the first and second end surfaces and passing through the four side surfaces;
wherein:
each insert corner has associated therewith:
an associated primary cutting edge extending from said each insert corner in a downward direction towards the median plane; and
an associated wiper extending from said each insert corner in an upward direction away from the median plane, said wiper rising above an associated abutment surface with respect to the median plane.

15. The milling cutter according to claim 14, wherein the cutting insert is seated such that:
the cutting insert has an overall negative axial relief angle for providing axial clearance and an overall negative radial relief angle for providing radial clearance.

16. The milling cutter according to claim 14, wherein:
an operative primary cutting edge has a positive axial rake angle; and
an operative wiper has a negative radial rake angle.

17. The milling cutter according to claim 14, wherein:
the insert pocket has a pocket base which slopes downwardly in the axial direction towards the front face, and slopes downwardly in the radial direction towards the peripheral surface.

18. The milling cutter according to claim 14, wherein:
the insert pocket comprises spaced apart first and second radial abutment surfaces and an axial abutment surface which together provide three-point contact with adjacent non-operative sides of the cutting insert.

19. The milling cutter according to claim 14, wherein:
the insert pocket has a pocket base provided with a clamping bore which is inclined at a predetermined non-zero angle relative to a normal to the pocket base; and
a clamping screw passing through a through bore of the cutting insert and occupying the clamping bore applies a clamping force at least partially in a direction of a far corner of the insert pocket.

20. The milling cutter according to claim 14, wherein:
the cutting insert is seated in the at least one insert pocket such that an operative primary cutting edge and an operative wiper are arranged to cut a true 90° shoulder in a work piece, while still providing clearance for a non-operative primary cutting edge lying on the same plane as the operative wiper.

* * * * *